2,985,572

PROCESS FOR THE CONTINUOUS PRODUCTION OF HYDROCHLORIDES OF CYCLOALIPHATIC KETOXIMES

Otto von Schickh and Horst Metzger, Ludwigshafen (Rhine), Germany, assignors to Badische Anilin- & Soda-Fabrik Aktiengesellschaft, Ludwigshafen (Rhine), Rheinland-Pfalz, Germany No Drawing. Filed Feb. 9, 1959, Ser. No. 791,805
Claims priority, application Germany Feb. 14, 1958
5 Claims. (Cl. 204—158)

This invention relates to an improved process for the production of hydrochlorides of cycloaliphatic ketoximes by nitrosation of cycloaliphatic hydrocarbons in a prolonged operation and especially in a continuous operation. In particular, it relates to an improvement in the known nitrosation reactions of cycloalkanes by which certain disadvantages of the known methods are avoided. The improvement comprises the co-employment of special additives and the maintenance of a certain minimum concentration in the mixture of cycloalkanes to be reacted and nitrosating agent.

It is known that hydrochlorides of cycloaliphatic ketoximes are obtained by treating cycloaliphatic hydrocarbons with nitrosating agents, for example nitrosyl chloride or with nitrogen monoxide and chlorine, possibly with the addition of hydrogen chloride with the simultaneous action of active light. This process has the disadvantage that in uninterrupted prolonged operation the glass parts of the apparatus which are necessary for the passage of the light, or the lamp itself, become coated with a solid or viscous yellow-colored coating. In this way the free passage of the light is disturbed and this in turn has the effect that the reaction speed declines so that, especially when working continuously, the reaction must be interrupted at certain intervals of time and the apparatus or lamp must be cleaned.

The main object of the present invention is to avoid this disadvantage. A further object is to suppress the formation of byproducts in the known reaction of cycloalkanes with nitrosation agents and to improve the yield of oxime. Yet another object is to maintain the initial reaction speed even in prolonged operation and to keep fully available for the reaction the amount of light which is necessary for the reaction and which causes it.

We have found that the said objects are achieved and that hydrochlorides of cycloaliphatic ketoximes are obtained by the action of nitrosyl chloride or nitrogen monoxide and chlorine on cycloaliphatic hydrocarbons, possibly in the presence of hydrogen chloride, with simultaneous treatment with active light, even in prolonged operation and especially in continuous operation without the occurrence of the said difficulties by adding during the reaction such an amount of the mixture of byproducts formed during the nitrosation of cycloalkanes that the content of organically-combined chlorine in the reaction solution amounts to at least 0.5% by weight, advantageously 0.8 to 3% by weight, with reference to the amount of cycloalkane used.

The cycloaliphatic hydrocarbons used for the known processes, such as cyclopentane, cyclohexane, cyclooctane and cyclodecane, are suitable as initial materials.

Mixtures such as are to be added in definite amounts during the reaction to the cycloaliphatic hydrocarbons according to this invention are the residues obtained by the reaction of cycloalkanes with the said nitrosation agents after separation of the oxime hydrochlorides and distilling off the unreacted cycloalkane. They consist mainly of chlorinated cycloalkanes, cycloalkyl nitrates, cycloalkanols and cycloalkanones, mono- and di-chlorcycloalkanes being the chief components. An accurate specification of the composition of these residues which hitherto were thrown away and when working continuously were removed from the circulating cycloalkanes, is not possible because the separation of the constituents of the mixture which do not contain chlorine from the mixture offers considerable difficulty. In general, the amount of the compounds containing chlorine in the residues amounts to about 75 to 95% by weight. As a rule the residues contain about 20 to 40% by weight of organically-combined chlorine. The addition of chlorine compounds alone is not sufficient to prevent a coating on the light-permeable parts of the apparatus. It is necessary to add to the hydrocarbons to be reacted, the mixture of the whole residue, i.e. without separation of components, and indeed in such an amount that the content of organically-combined chlorine in the reaction solution is at least 0.5% by weight with reference to the amount of cycloalkane used. The most suitable amounts are different for the individual cycloaliphatic hydrocarbons to be nitrosated but may be readily ascertained by preliminary test. In general, from 0.5 to 5% by weight of organically-combined chlorine with reference to the amount of cycloalkane is satisfactory, and from about 0.8 to about 3% by weight is our preferred range.

Whereas the lower limit of at least 0.5% by weight is a critical value and when a minimum level of byproducts which is below the said limit is maintained the desired effect, namely the maintenance of the apparatus free from coatings, is not achieved, the upper limit is not critical. It is rather determined by reasons of expediency so that unnecessarily large amounts of these byproducts are not present in the reaction mixture.

The process is carried out in the manner known for the reaction of cycloaliphatic hydrocarbons with nitrosation agents and under known conditions, for example at temperatures of −30° to +40° C., preferably at 10° to 25° C.

In carrying out the process, the procedure may consist of adding the mixture of working-up residues in the said minimum amount to the cycloalkane hydrocarbon or to the initial hydrocarbon already used one or more times for the nitrosation reaction, and thereafter introducing into the mixture, possibly after saturation with hydrogen chloride, and while irradiating with active light, for example with light of about 350 to 450 millimicrons, nitrosyl chloride or nitrogen monoxide and chlorine, possibly while leading in further hydrogen chloride. Instead of nitrosyl chloride itself, there may also be used for example an alkyl nitrite such as amyl nitrite and hydrogen chloride from which nitrosyl chloride is formed by reaction. For substantial utilization of the active light rays, it is preferable to introduce into the cycloalkane continuously such an amount of the nitrosation reaction components that there is always present in the reaction mixture a concentration of nitrosation agent sufficient for substantial absorption of the active light rays. To calculate an advantageous concentration of nitrosation agent, use may be made of the light permeability or extinction at a wave length of about 450 millimicrons of a solution of the nitrosation agent, for example nitrosyl chloride, in the cycloalkane with a given thickness of layer. The oxime hydrochloride which separates in liquid form during the reaction, can readily be withdrawn from the bottom of the reaction vessel, for example by way of a Florentine receiver.

In order that in continuous operation the level of byproducts chosen at the beginning of the reaction and set by means of the organically-combined chlorine should not be allowed to increase unnecessarily, it is preferable to branch off continuously or periodically from the circulated cycloaliphatic hydrocarbon a certain amount and to return the hydrocarbon after separating the byproducts, for example by distillation.

It is surprising that by setting up a minimum concentration in the cycloaliphatic hydrocarbon of the byproducts always formed in the nitrosation of cycloalkanes, either before the nitrosation or shortly after the reaction has been set into operation, i.e., before the reaction speed subsides or formation of coatings on apparatus parts takes place, the formation of a coating on the light-permeable apparatus parts no longer takes place, whereas once a coating has formed on these apparatus parts it is not removed even when the minimum concentration or a higher concentration of the said byproducts is subsequently set up during the reaction.

The oxime hydrochlorides obtained according to the process of this invention are of high purity. No prolongation of the reaction period necessary for the reaction of a given amount of nitrosation agent occurs even in continuous operation over a long period, for example of two months.

The following examples will further illustrate this invention but the invention is not restricted to these examples.

EXAMPLE 1

A mercury immersion lamp of 80 watts is introduced into a cooling vessel of glass provided with a supply and discharge and open at the top, and the cooling vessel is placed inside a cylindrical stirring vessel 21 centimeters long and 9.5 centimeters in internal width which is provided at the bottom with a drain cock. 830 grams of cyclo-octane are charged into the reaction vessel and saturated at room temperature with hydrogen chloride. To the mixture there are then added 25 grams of a mixture obtained as residue in the working up of a reaction mixture obtained by reaction of cyclo-octane with nitrosyl chloride after separation of the oxime hydrochloride and distillative separation of the unreacted cyclo-octane, and which has a content of organically-combined chlorine of 27% by weight. The mercury lamp is set in operation, 10 grams of nitrosyl chloride are added to the mixture in one portion and while stirring and cooling the reaction mixture there is continually led in at about 25° C. a stream of hydrogen chloride so that the solution remains saturated with hydrogen chloride. The cyclo-octanone oxime hydrochloride formed separates as a heavy oil which sinks to the bottom. As soon as the reaction solution has become decolorized, a further 10 grams of nitrosyl chloride is added. The same procedure is followed but from time to time the oxime hydrochloride collecting at the bottom is withdrawn and replaced by fresh cyclo-octane. After the reaction of a total of 90 grams of nitrosyl chloride, the period necessary for the decolorization of a further portion of 10 grams of nitrosyl chloride is no longer than was necessary for the decolorization of the first 10 gram portion of nitrosyl chloride. The period necessary for the decolorization of a 10 gram portion of nitrosyl chloride amounts in each case to 185 minutes. Discoloration of the reaction solution by reason of impurities does not take place.

The glass cooling vessel is entirely free from coating after the reaction of the whole of the 100 grams or nitrosyl chloride introduced. After neutralizing the cyclo-octanone oxime hydrochloride obtained with caustic soda solution there are obtained in all 187 grams of cyclo-octanone oxime of the melting point 42° C. The yield of oxime therefore amounts to 87% of the theory with reference to nitrosyl chloride introduced.

By working in the same way under the same conditions but without adding the mixture of worked-up residue to the initial cyclo-octane prior to the introduction of the first 10 gram portion of nitrosyl chloride, the reaction period for the decoloration of the tenth 10 gram portion of nitrosyl chloride is already half as long again as for the decoloration of the first 10 gram portion of nitrosyl chloride. The period necessary for decoloration of the first 10 gram portion of nitrosyl chloride is 185 minutes and that for the last 10 gram portion about 280 minutes.

The cooling vessel of glass is coated with a yellow coating. In this case the amount of cyclo-octanone oxime set free from the resultant hydrochloride and recovered amounts to only 84% with reference to the total amount of nitrosyl chloride introduced (100 grams). The cyclo-octanone oxime obtained melts at 42° C.

EXAMPLE 2

900 grams of cyclohexane are saturated with hydrogen chloride and into the solution there are introduced 15 grams of the mixture which remains as residue in the working up of a reaction product obtained by reaction of cyclohexane with nitrosyl chloride after separation of the oxime hydrochloride and distillative separation of the unreacted cyclohexane, and which contains 33% by weight of organically-combined chlorine. The reaction of this mixture with nitrosyl chloride takes place in the way described in Example 1, and under the conditions therein described and in the apparatus therein described but with a reaction temperature of about 12° C. The decoloration of the first 10 gram portion of nitrosyl chloride takes place in 215 minutes. After reaction in portions of a total of 90 grams of nitrosyl chloride, the reaction of a further 10 grams of nitrosyl chloride added requires 220 minutes up to decoloration of the reaction solution.

By working in the same way but without any addition of the residue mixture to the cyclohexane saturated with hydrogen chloride, the reaction of the first 10 gram portion of nitrosyl chloride up to decoloration requires 215 minutes whereas after adding a total of 90 grams of nitrosyl chloride in portions, the reaction of a further 10 gram portion of nitrosyl chloride up to decoloration of the reaction solution requires 330 minutes.

EXAMPLE 3

In a reaction tube which is provided at the bottom with a drain cock and at the side with a recycling means combined with a cooler, there is placed a double-walled glass vessel closed at the bottom. A mercury vapor lamp is introduced into the inner glass vessel and cooling water allowed to flow through the jacket between the double walls. The space between the cooling jacket and the wall of the reaction vessel, which has a capacity of 75 liters, is charged with 60 liters (50 kilograms) of cyclo-octane. The cyclo-octane is saturated with hydrogen chloride and there are added thereto 2.8 kilograms of a mixture which remains as a residue of the reaction mixture obtained by reaction of cyclo-octane with nitrosyl chloride after it has been worked up and which has a content of 28% by weight of organically-combined chlorine. The solution is irradiated after one portion (570 grams) of nitrosyl chloride has been added thereto. During the irradiation, gaseous hydrogen chloride is led in and the reaction material is well mixed at a temperature of 20° C. by recycling and cooling. Up to the point at which the reaction solution which has been colored red-brown by the addition of the nitrosyl chloride has become decolored, 250 grams of hydrogen chloride are led in in all. After the reaction, i.e. after the decoloration of the first portion of nitrosyl chloride, a second, third, fourth portion and so on, each of 570 grams, are reacted in the same way while leading in hydrogen chloride. A total of 30 portions, i.e. 17.1 kilograms of nitrosyl chloride, are reacted in this way. The periods which are necessary for the reaction of each portion, i.e. up to complete decoloration of the reaction solution in each case, are measured. The liquid cyclo-octanone oxime hydrochloride separating at the bottom of the reaction vessel is run off from time to time and a corresponding amount of fresh cyclo-octane added. After the reaction of a total of 17.1 kilograms of added nitrosyl chloride there are obtained 32.1 kilograms of cyclo-octanone oxime of the melting point 42° C. from the collected and purified crude cyclo-octanone oxime hydrochloride by neutralization with caustic alkali solution. The yield is 87% by weight of the theory with reference to the nitrosyl chloride introduced.

In the following table there are set out for each five portions of nitrosyl chloride the measured periods for the reaction of these nitrosyl chloride portions. The table also contains the reaction periods required for the decoloration of each 5 portions of nitrosyl chloride when working in the same way but using cyclo-octane containing no addition of residue mixture. When using such a cyclo-octane 31.1 kilograms of cyclo-octanone oxime of the melting point 42° C. are obtained by neutralization with caustic alkali solution from the amount of oxime hydrochloride obtained after the reaction of a total of 30 portions of 570 grams each of nitrosyl chloride. The yield is thus 84% of the theory with reference to nitrosyl chloride introduced.

Table

| Number of the reacted portions of nitrosyl chloride | Reaction period up to complete decoloration of the reaction solution with an initial cyclo-octane to which— | |
|---|---|---|
| | a residue mixture of byproducts is added | no residue mixture is added |
| | Minutes | Minutes |
| 1 | 90 | 88 |
| 5 | 88 | 100 |
| 10 | 93 | 115 |
| 15 | 90 | 145 |
| 20 | 90 | 185 |
| 25 | 87 | 230 |
| 30 | 92 | 265 |

EXAMPLE 4

A mercury vapor immersion lamp of 80 watts is introduced into a cooling vessel open at the top and provided with a supply and discharge and the cooling vessel itself is placed inside a cylindrical stirring vessel 21 centimeters long and 9.5 centimeters in internal width which is provided at the bottom with a discharge cock. The reaction vessel is charged with 850 grams of cyclohexane, the hydrocarbon is saturated at room temperature with hydrogen chloride and to the mixture there are added 30 grams of a mixture which contains 32% by weight of organically-combined chlorine and which remains as a residue in the working up of a reaction product obtained by reaction of cyclohexane with nitrosyl chloride or with nitrogen monoxide and chlorine in the presence of hydrogen chloride, after separation of the oxime hydrochloride and distillative separation of the unreacted cyclohexane. The mercury vapor lamp is set in operation and at 15° C. while stirring vigorously with a "Hösch" stirrer there are led in simultaneously per hour 2,300 ccs. of nitrogen monoxide and 1,000 ccs. of chlorine gas and 300 ccs. of dry hydrogen chloride. The liquid cyclohexanone oxime hydrochloride separating at the bottom of the reaction vessel is run off from time to time, dissolved in water and neutralized with 2-normal caustic soda solution. After a reaction period of 2½ hours, 6.8 grams of cyclohexanone oxime of the melting point 88° to 89° C. are obtained in this way. The same procedure is continued and the separated cyclohexanone oxime hydrochloride replaced by fresh cyclohexane. After a total reaction period of 25 hours, 66 grams in all of cyclohexanone oxime are obtained after neutralization of the oxime hydrochloride in the way described. The glass cooling vessel is entirely free from coating.

By working in the same way under the same conditions but without adding the mixture of working-up residue to the intial cyclohexane at the beginning of the reaction, only 51 grams of cyclohexanone oxime are obtained after a total reaction period of 25 hours. The glass cooling vessel is covered with a yellow-brown coating.

We claim:
1. In a method of producing hydrochlorides of cycloaliphatic ketoximes in which a cycloaliphatic hydrocarbon having from 5 to 10 carbon atoms is acted upon by a nitrosating agent selected from the group consisting of nitrosyl chloride and nitrogen monoxide and chlorine in the presence of activating light which comprises: adding to a mixture of said nitrosating agent and said hydrocarbon the residue material obtained in the photo-nitrosation reaction of a cycloalkane after separating the oxime hydrochloride and distilling off the unreacted cycloalkane from the nitrosation reaction mixture, said residue consisting mainly of chlorinated cycloalkanes, cycloalkyl nitrates, cycloalkanols and cycloalkanones, in an amount sufficient to provide said mixture with an organically-combined chlorine content of at least 0.5% by weight based on the weight of the cycloalkane in the reaction mixture.

2. An improved method as in claim 1 wherein the residue material is added to the cycloaliphatic hydrocarbon charge in an amount so that the content of organically-combined chlorine in the mixture is from 0.5 to 5% by weight with respect to the weight of the cycloaliphatic hydrocarbon, and wherein the mixture is then allowed to react with the nitrosating agent with a simultaneous irradiation with active light.

3. In a continuous process for producing hydrochlorides of cycloaliphatic ketoximes in which a cycloaliphatic hydrocarbon having from 5 to 10 carbon atoms is acted upon by a nitrosating agent selected from the group consisting of nitrosyl chloride and nitrogen monoxide and chlorine in the presence of hydrogen chloride and activating light, the improvement which comprises: adding to the reaction mixture prior to a lessening of the reaction speed a mixture of residue material obtained in the photo-nitrosation reaction of a cycloalkane after separating the oxime hydrochloride and distilling off the unreacted cycloalkane from the nitrosation reaction mixture, said residue consisting mainly of chlorinated cycloalkanes, cycloalkyl nitrates, cycloalkanols and cycloalkanones, in an amount sufficient to provide said mixture with an organically-combined chlorine content of at least 0.5% by weight based on the weight of the cycloaliphatic hydrocarbons in the reaction mixture.

4. In a continuous process for the production of hydrochlorides of cycloaliphatic ketoximes in which a cycloaliphatic hydrocarbon having from 5 to 10 carbon atoms is acted upon by a nitrosating agent selected from the group consisting of nitrosyl chloride and nitrogen monoxide and chlorine in the presence of activating light, the improvement which comprises: continuously adding to a mixture of said nitrosating agent and said hydrocarbon the residue material obtained in the photo-nitrosation reaction of a cycloalkane after separating the oxime hydrochloride and distilling off the unreacted cycloalkane from the nitrosation mixture, said residue consisting mainly of chlorinated cycloalkanes, cycloalkyl nitrates, cycloalkanols and cycloalkanones, in an amount sufficient to provide said mixture with a constant organically-combined chlorine content of from about 0.5% to about 5% by weight based on the weight of the cycloaliphatic hydrocarbon in the reaction mixture.

5. In a method of producing hydrochlorides of cycloaliphatic ketoximes in which a cycloaliphatic hydrocarbon having from 5 to 10 carbon atoms is acted upon by a nitrosating agent selected from the group consisting of nitrosyl chloride and nitrogen monoxide and chlorine in the presence of activating light which comprises: adding to a mixture of said nitrosating agent and said hydrocarbon the residue material obtained in the photo-nitrosation reaction of a cycloalkane after separating the oxime hydrochloride and distilling off the unreacted cycloalkane from the nitrosation reaction mixture, said residue consisting mainly of chlorinated cycloalkanes, cycloalkyl nitrates, cycloalkanols and cycloalkanones, in an amount sufficient to provide said mixture with an organically-combined chlorine content of from about 0.8% to about 3% by weight based on the weight of the cycloalkane in the reaction mixture.

References Cited in the file of this patent

UNITED STATES PATENTS

| | | |
|---|---|---|
| 2,719,116 | Brown | Sept. 27, 1955 |
| 2,879,215 | Reppe et al. | Mar. 24, 1959 |